Figures 1, 2:
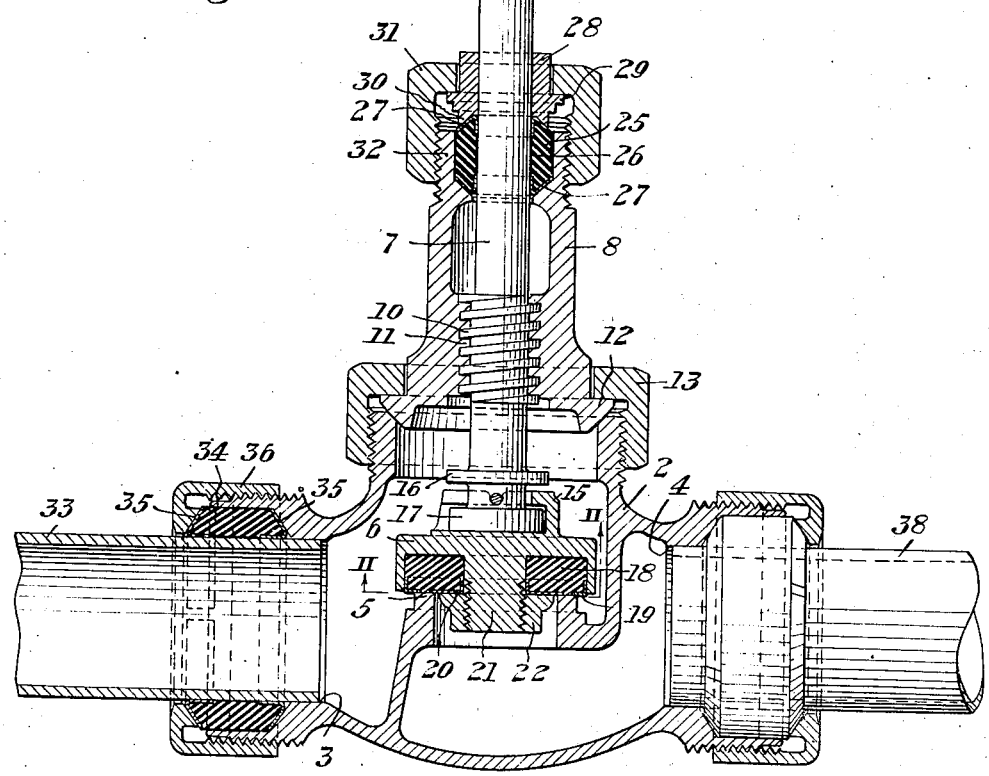

April 16, 1940.　　F. J. RAYBOULD　　2,197,384

VALVE

Filed Nov. 3, 1938

INVENTOR
Frank J. Raybould

Patented Apr. 16, 1940

2,197,384

UNITED STATES PATENT OFFICE 2,197,384

VALVE

Frank J. Raybould, Erie, Pa., assignor to Raybould Coupling Company, Meadville, Pa., a corporation of Pennsylvania Application November 3, 1938, Serial No. 238,571

5 Claims. (Cl. 251—27)

The present invention relates to valves generally and more particularly to certain improvements in valves for controlling the flow of fluids. By the present invention I provide a valve structure which will at all times during service thereof provide a tight seal between the valve member and the valve seat so that there will be no escape of fluid through the valve when in closed position. My invention also provides a structure in which the stuffing box packing for the valve is of such character that it will remain effective throughout the life of the valve and which will not blow out in service if the valve is included in a high pressure system.

In the accompanying drawing I have shown for purposes of illustration only a preferred embodiment of the present invention. In the drawing—

Figure 1 is a sectional view through the valve which I provide and through a portion of one of the connecting lines, and Figure 2 is a section taken along the line II of Figure 1.

As shown in the drawing the valve which I provide includes a casing 2 having an inlet opening 3 and an outlet opening 4, the openings 3 and 4 being on opposite sides of the valve seat 5 which is formed integral with the casing 2. The valve also embodies a valve member 6 which is adapted to cooperate with the valve seat 5. The valve member 6 is carried by the valve stem 7 which extends upwardly through the neck portion 8 of the valve and at its upper end is provided with a hand wheel 9 for facilitating rotation thereof. The valve stem 7 is provided with threads 10 cooperating with an internally threaded section 11 of the neck portion 8, whereby rotation of the valve stem 7 will result in the raising or lowering thereof with the consequent raising or lowering of the valve member 6 away from or into contact with the valve seat 5. The neck portion 8 of the valve is flanged at its lower end as indicated by the reference character 12, the flange 12 resting upon the upper portion of the valve body. A threaded nut 13 cooperates with threads carried by the valve body and rotation of this nut in a clockwise direction will securely connect the main body of the valve and the neck portion 8.

The valve member 6 on the face thereof opposite the valve seat is provided with an upwardly extending slotted portion 15 which cooperates with collars 16 and 17 carried by the lower end of the valve stem. This arrangement may be utilized in order to permit the entire valve member to be removed from the valve, although it will be understood that the valve member can, if desired, be made integral with the valve stem.

The opposite face of the valve member is recessed so as to provide an annular groove therein. This annular groove or recessed portion is positioned for cooperation with the valve seat. This groove or recess is provided with a ring 18 of resilient material, the resilient material forming the seat engaging portion of the valve member. This ring of resilient material may be made of rubber or of any other suitable material and it may be formed of a resilient material of any suitable consistency. The ring of resilient material is provided with retaining rings which extend angularly around at least one of the exposed edges thereof. As shown in the drawing one retaining ring 19 extends angularly about the outer edge of the resilient ring and another retaining ring 20 extends angularly about the inner edge thereof. These retaining rings 19 and 20 extend along the face of the resilient ring to a sufficient extent to extend over the inner and outer edges of the valve seat. However, these retaining rings do not completely cover the seat engaging portion of the valve member as the ends thereof are spaced so as to permit the extrusion of some of the resilient material into contact with the valve seat when the valve member is brought into pressure engagement with the seat.

The retaining rings 19 and 20 may be split, slotted or solid rings, and they may be made of any suitable material. I have found that the use of copper retaining rings affords highly satisfactory results.

The stud 21 on the lower end of the valve stem 7 is threaded for cooperation with a nut 22. The nut 22 holds the resilient ring and the inner metallic retaining ring in position in the recess of the valve member.

As will be readily understood from the description given above, movement of the valve member toward the valve seat causes the retaining rings 19 and 20 to come into contact with the valve seat at the inner and outer peripheries thereof. The legs of the rings 19 and 20 extending along the face of the valve member are spaced apart so that the resilient material may be extruded therebetween so as to bring it into contact with the valve seat. Ordinarily only a relatively slight amount of pressure will be required to extrude the resilient material into contact with the valve seat. The pressure required will, of course, be dependent upon the resiliency of the material used. It will be understood that when such extrusion takes place it provides a very effective seal which will not permit the escape of fluid through the valve. The retaining rings, in view of the fact that they extend over the edges of the valve seat, prevent any of the resilient material from being extruded along the edges of the valve seat, and in view of the fact that the retaining rings extend inwardly of the recess adjacent the outer edges of the ring of resilient material, none of the resilient material can escape from the recess in the valve member.

The collar 8 is provided with a packing recess 25. Instead of the usual packing employed along the valve stem to prevent leakage I provide a ring 26 of resilient material. The ring 26 is provided with retaining rings or bushings 27 extending angularly about the exposed edges thereof so as to prevent any of the resilient material from escaping from the packing chamber 25 when the packing is subjected to pressure. The packing ring is maintained in position by means of a ring 28 provided with a shoulder 29 and an inclined face 30 abutting the resilient packing ring or the bushing thereon. This ring 28 is moved downwardly into pressure engagement with the packing ring by means of a nut 31 which cooperates with the shoulder 29 thereon at one end and at the other end with a threaded portion 32 of the collar 8. When axial pressure is exerted upon the resilient packing ring the ring is expanded radially and an exceedingly tight fit can be obtained in this manner if desired so as to prevent the escape of any gas or liquid along the valve stem. In fact, a sufficient amount of pressure can be very readily exerted upon the packing ring to securely hold the valve stem in any adjusted position over a very long period of time.

The pipe member 33 is connected to the inlet opening 3 by means of a resilient compression ring 34 provided with bushings 35 extending angularly about edges thereof. Axial pressure is exerted upon the compression ring and the bushing thereon by means of a threaded nut 36 which cooperates with a threaded section 37 on the valve body. Axial compression of the compression ring causes it to expand radially and to exert adequate pressure upon the pipe member 33 to hold it securely in the valve. The pipe 38 is secured to the outlet end of the valve in the same manner as the inlet pipe.

While, as indicated above, the resilient compression rings utilized in the structure just described are preferably made of rubber of suitable consistency, it will be understood that these rings may be made of any other material having appropriate resiliency for the purpose intended. While we have indicated that the bushings or retaining rings are preferably of metal, it will be understood that they likewise can be made of any other suitable material.

It will readily be seen by those skilled in this art that the structure which has just been described has numerous advantages over the prior art structures. The use of a compression ring provided with appropriate metallic bushings or retaining rings is superior to any of the presently known types of packings for valves. It will not lose its resiliency in use, as does the ordinary loose packing material, and it will not be blown from the stuffing box if the valve structure is utilized in a high pressure system. The provision of a valve member having a seat engaging portion of resilient material provided with retaining rings that cooperate with the resilient seat engaging portion and with the valve seat provides a structure in which a very positive seal between the valve member and the valve seat is obtained and it will be comparatively indestructible over a long period of time since it is completely protected from the fluid passing through the valve by virtue of the retainer ring.

While I have described a preferred embodiment of my invention it will be understood that I am not limited thereto and that my invention may be otherwise embodied within the scope of the following claims.

I claim:

1. A valve comprising a valve seat, a valve member, said valve member having a seat engaging portion of resilient material provided with a retaining ring extending angularly about each edge adjacent the valve seat, the retaining rings and resilient material being so constructed and arranged as to each contact the seat when the valve member is brought into pressure engagement with the seat, and means for moving the valve member into and out of engagement with said seat.

2. A valve comprising a valve seat, a valve member, said valve member having a seat engaging portion of resilient material provided with a retaining ring extending angularly about each edge adjacent the valve seat, the retaining rings and resilient material being so constructed and arranged as to each contact the seat when the valve member is brought into pressure engagement with the seat, the rings engaging the inner and outer peripheries of the seat and the resilient material engaging the portion therebetween, and means for moving the valve seat into and out of engagement with said seat.

3. A valve comprising a casing, a valve seat in the casing, a valve member movable into and out of engagement with the seat, said valve member having a seat engaging portion of resilient material and a split retaining ring extending angularly about each edge of the resilient portion adjacent the valve seat and inwardly along the face of the resilient portion adjacent the seat, said rings and resilient portion being so constructed and arranged as to each contact the seat when the valve member is brought into pressure engagement with the seat, and means for moving the valve member into and out of engagement with said seat.

4. A valve comprising a casing, a valve seat in the casing, a valve member movable into and out of engagement with the seat, said valve member having a recess in the face adjacent the valve seat, a ring of resilient material positioned in said recess and arranged to cooperate with the valve seat, a retaining ring extending peripherally and angularly around each outer edge of said resilient ring, at least one of said rings being arranged to contact said seat when the ring of resilient material is brought into pressure contact with the seat, and means for moving the valve member into and out of engagement with said seat.

5. A valve comprising a casing, a valve seat in the casing, a valve member movable into and out of engagement with the seat, said valve member having a recess in the face adjacent the valve seat, a ring of resilient material positioned in said recess and arranged to cooperate with the valve seat, a retaining ring extending peripherally and angularly around each outer edge of said resilient ring, at least one of said rings being arranged to contact said seat when the ring of resilient material is brought into pressure contact with the seat, a stud carried by said valve member and extending beyond the face of said ring of resilient material, means carried by the stud for holding the ring of resilient material and one of the retaining rings in the recess, and means for moving the valve member into and out of engagement with the seat.

FRANK J. RAYBOULD.